US011186438B2

(12) United States Patent
Galassini et al.

(10) Patent No.: US 11,186,438 B2
(45) Date of Patent: Nov. 30, 2021

(54) SUPPORT DEVICE FOR A RIGID CHAIN PROVIDED WITH SUPPORT PINS

(71) Applicant: TOTAL RAFFINAGE CHIMIE, Courbevoie (FR)

(72) Inventors: Giuseppe Galassini, Santa Maria delle Mole (IT); Nicolas Gassmann, Baons le Comte (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 0 days.

(21) Appl. No.: 16/651,266

(22) PCT Filed: Sep. 24, 2018

(86) PCT No.: PCT/EP2018/075814
§ 371 (c)(1),
(2) Date: Mar. 26, 2020

(87) PCT Pub. No.: WO2019/063487
PCT Pub. Date: Apr. 4, 2019

(65) Prior Publication Data
US 2020/0223637 A1    Jul. 16, 2020

(30) Foreign Application Priority Data

Sep. 29, 2017   (FR) ...................................... 1759089

(51) Int. Cl.
*B65G 15/30*  (2006.01)
*F16G 13/20*  (2006.01)

(52) U.S. Cl.
CPC ............. *B65G 15/30* (2013.01); *F16G 13/20* (2013.01)

(58) Field of Classification Search
CPC ......... F16G 13/20; B01J 8/003; B01J 8/2208; B01J 2208/00752; B01J 2208/00769; B01J 2208/00858; B01J 2208/00893
See application file for complete search history.

(56) References Cited

U.S. PATENT DOCUMENTS 2,432,411 A    12/1947   Guerin et al.
5,193,660 A     3/1993   McKernan et al.
(Continued)

FOREIGN PATENT DOCUMENTS

| DE | 102014007458 A1 * | 11/2015 | ............. F16G 13/20 |
| DE | 102014007458 A1 | 11/2015 | |
| WO | 2013186497 A1 | 12/2013 | |

OTHER PUBLICATIONS

International Search Report issued in Application No. PCT/EP2018/075814, dated Oct. 29, 2018; 7 pages.

*Primary Examiner* — Timothy L Maust
(74) *Attorney, Agent, or Firm* — Albert Shung

(57) ABSTRACT

The invention relates to a support device for a rigid chain (401) composed of links (402) that are connected in pairs by rollers (403). The movement of the rigid chain is guided by an internal housing (406) of a support casing (405). One or more support pins (404) project from one side of the chain, parallel to the axis of the link rollers. Furthermore, a face (411) of the casing extending substantially perpendicularly to the axes of the rollers has a through-groove (412) communicating with the internal housing (406). This groove (412) extends along the entire length of the housing and has dimensions, in a plane perpendicular to the axes of the rollers (403), that are sufficient to allow through only the support pin(s) (404), which pass through the groove (412) and protrude from the support casing (405) by a predetermined length allowing the fastening of one or more functional elements.

13 Claims, 5 Drawing Sheets

(56) References Cited

U.S. PATENT DOCUMENTS 8,250,846 B2 * 8/2012 Soerensen .............. F16G 13/20
                                                    59/78
2010/0140572 A1   6/2010 Aoki
2015/0144223 A1 * 5/2015 Mairesse ................. B01J 8/003
                                                    141/94

* cited by examiner

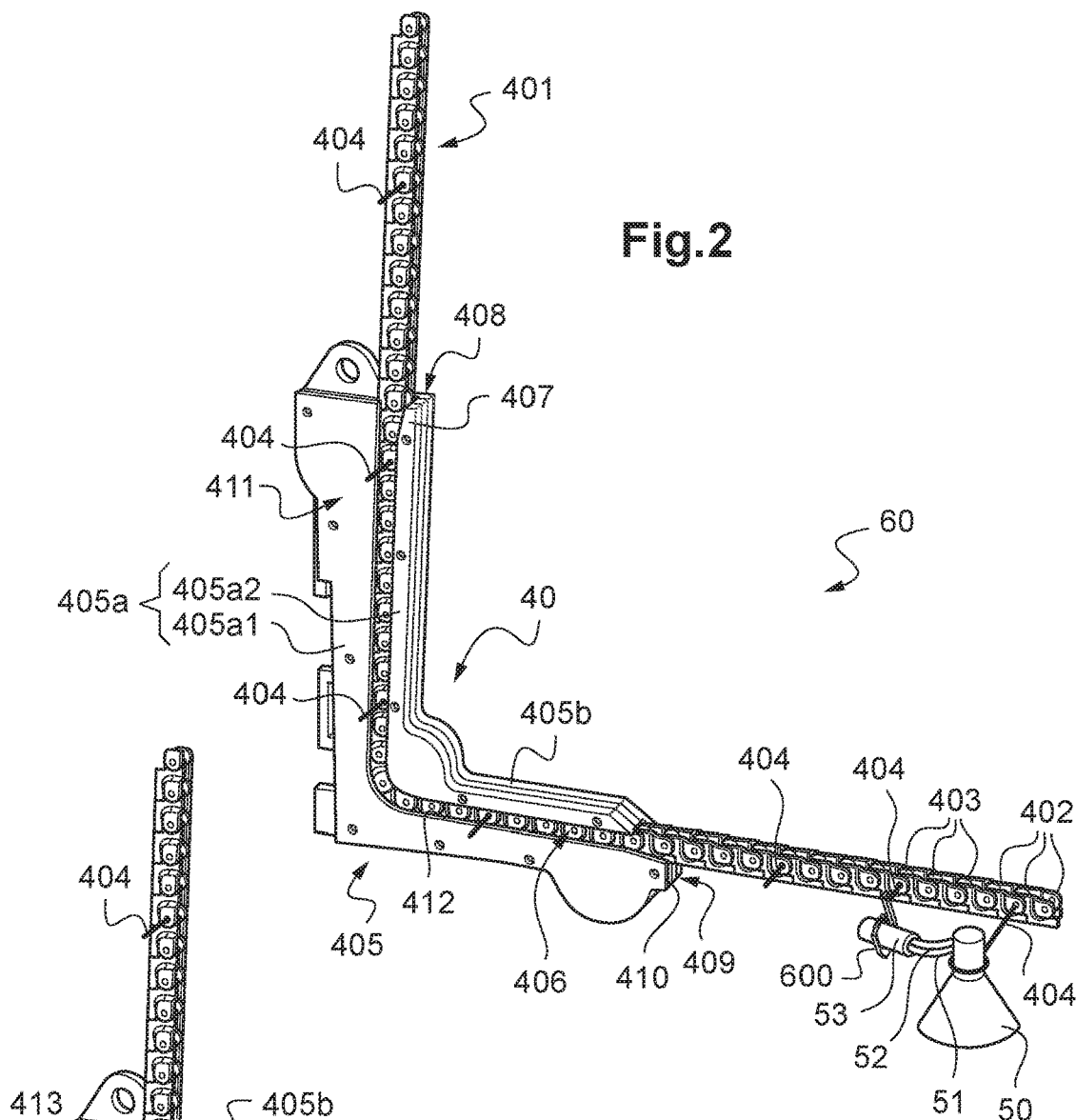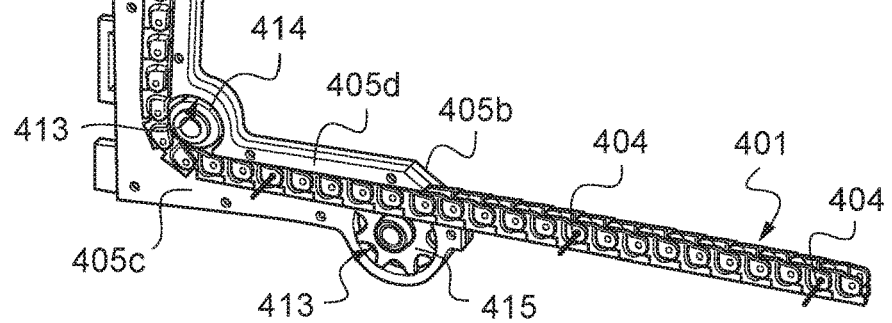

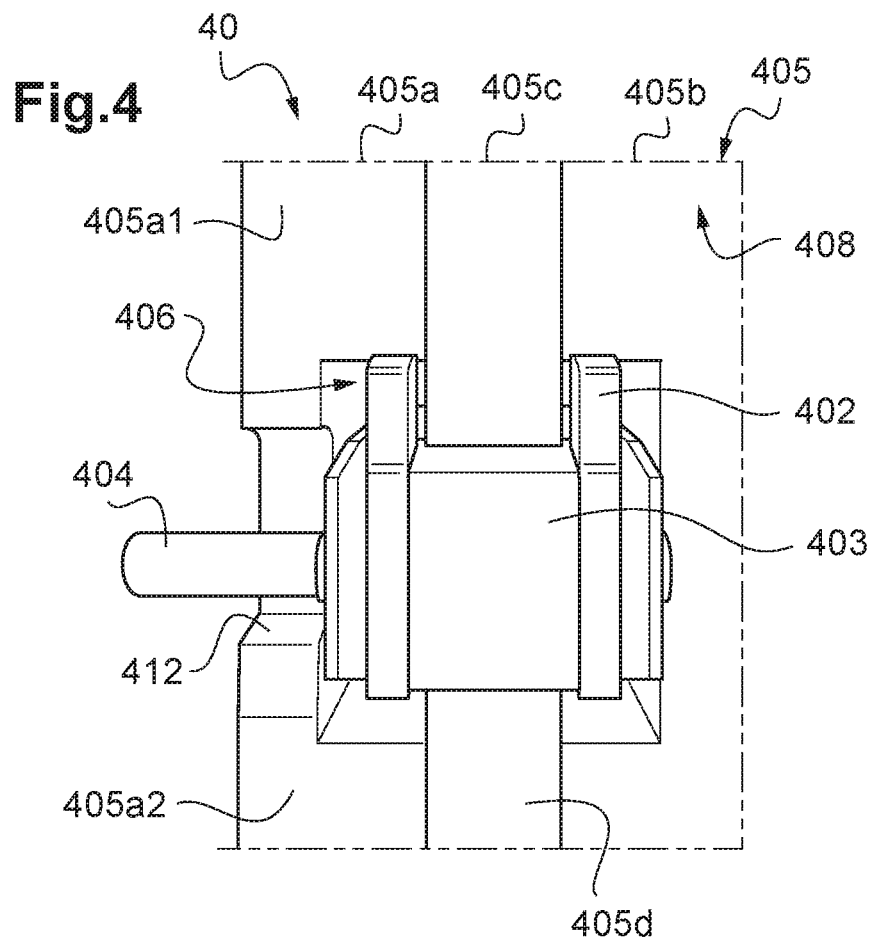
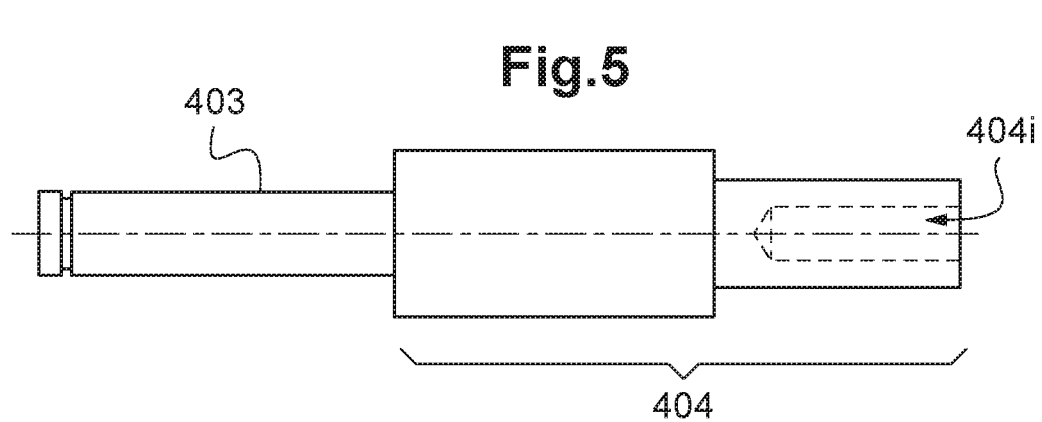

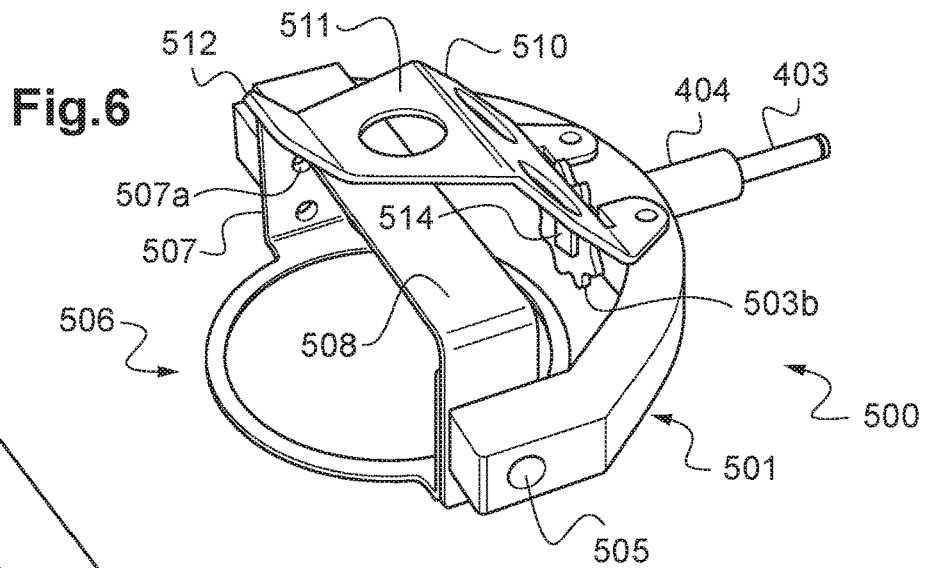
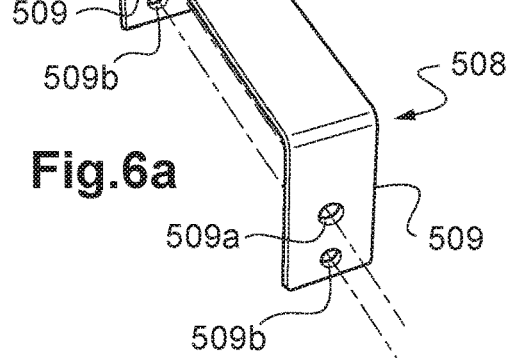
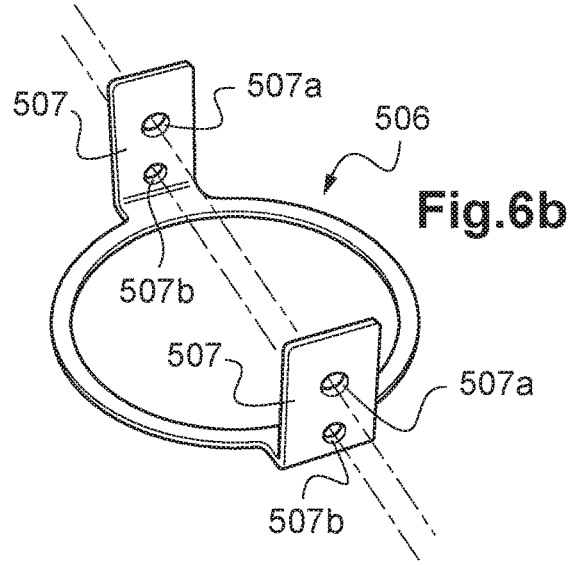
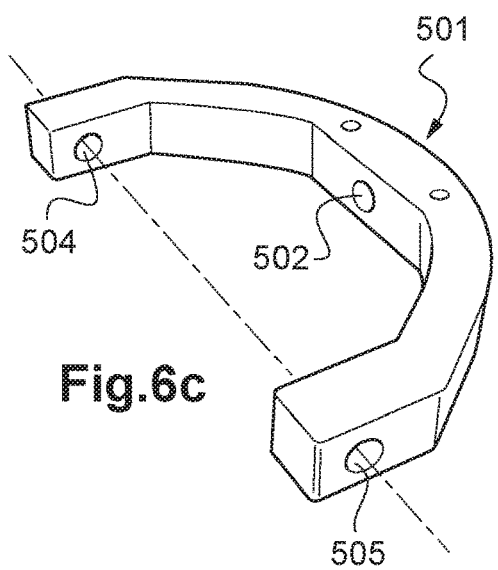
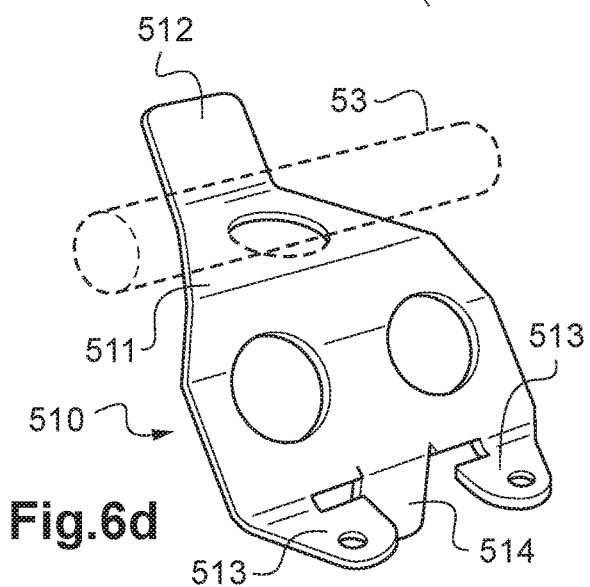

SUPPORT DEVICE FOR A RIGID CHAIN PROVIDED WITH SUPPORT PINS

CROSS-REFERENCE TO RELATED APPLICATIONS

This application claims the benefit of PCT/EP2018/075814 filed Sep. 24, 2018, which claims priority from FR 1759089 filed Sep. 29, 2017, which are incorporated herein by reference in their entireties for all purposes.

The invention relates to a support device for a rigid chain provided with support pins, notably for a functional element. The support device is more particularly suitable for use in an industrial reactor for introducing one or more functional elements into the interior of the reactor via the rigid chain.

In numerous industrial fields, it is necessary to charge solid particles into a vessel, in particular into a reactor, notably of the chemical, electrochemical, oil or petrochemical type. The solid particles are generally introduced through a filling opening of the reactor situated at the top of the reactor and at the center thereof, this introduction being effected by means of an appropriate charging device. This type of charging is usually monitored and controlled in order to obtain optimal charging conditions. To this end, one or more measuring probes (or sensors) can be disposed inside the reactor, in particular during the filling process. More generally, probes are installed inside the reactor in order to measure parameters relating to the monitoring of the charging of the solid particles into the vessel.

The installation in the reactor of such a distribution system, including notably the device for charging the particles and the probe supports, can be relatively difficult to effect, however. One of the main constraints that operators of this type of material can face is associated with the sometimes extreme internal congestion of a reactor, which may contain plates, thermocouples and supports for these elements. This constraint is thus associated with the limited space available to the operators for maneuvering the charging device for the installation and adjustment thereof.

The document WO2013186497 describes a system for distributing solid particles in a vessel that can be positioned with greater flexibility. Notably, a sensor support device is mounted in a movable manner with respect to the charging device. In one embodiment, that support device comprises a rigid chain and a guide element for guiding the rigid chain such that a portion of the chain at an outlet of that guiding element extends (along its length) in a different direction than that of a portion of the chain at the inlet of the guide element. That device makes it possible to offset a sensor carried by the rigid chain. However, the sensor is fitted on the rigid chain at the part of the latter situated downstream of the guide element in relation to a movement of the chain in the direction of the reactor, generally inside the reactor. This fitting may prove difficult, notably on account of the lack of light, the temperature inside the reactor and the confined space. The fitting time can thus be relatively long and slow down the charging and starting up of the reactor. Moreover, the sensor is generally suspended manually on the rigid chain, such that the positioning thereof is not very precise and is not always reproducible from one charging operation to another. On account of the suspension, the sensor is liable to move during measurements. The quality of monitoring of the charging operation can thus be negatively affected by the lack of precision in the positioning of the sensor and/or the movements thereof. Furthermore, the sensor is often suspended relatively low, for example on an arm, and this can reduce its capacity to measure the charging profile inasmuch as this type of sensor usually has, by design, a measuring dead zone over the last 500 mm.

In addition, most of the time, it is necessary to modify the sensor in order to be able to suspend it: thus, sometimes, the cover of the sensor is pierced in order for it to be fastened, and this can damage it, notably due to the penetration of water.

There is a need to improve the positioning of a functional element supported by a support device, notably for a system for distributing solid particles in a vessel.

To this end, the invention relates to a support device for at least one functional element, comprising:
  a rigid support chain formed of a plurality of links articulated in pairs by rollers, the axes of which are parallel and arranged such that the chain can only bend in one direction from a rectilinear state,
  a closed support case provided with an internal housing having a first end that opens onto an inlet face of the support case and a second end that opens onto an outlet face of the support case, separate from the inlet face, the internal housing defining a chain path for receiving and guiding the support chain from the inlet face to the outlet face.

It will thus be appreciated that the internal housing guides any movement of the support chain along its length. Notably, the chain path receives and guides the support chain such that a portion of the chain at the outlet of the internal housing extends (along its length) in a different direction than that of a portion of the chain at the inlet of the internal housing.

According to the invention, the support device is such that:
  the chain is equipped with at least one support pin secured to a link, the support pin(s) protruding from one side of the chain, parallel to the axes of the link rollers,
  one face of the case extending substantially perpendicularly to the axes of the rollers has a through-slot communicating with the internal housing, this slot extending along the entire length of the latter and having dimensions, in a plane perpendicular to the axes of the rollers, that are sufficient to allow only the support pin(s) to pass through, the support pin(s) passing through the slot and protruding from the support case by a predetermined length.

Notably, the slot may have a dimension, in a direction perpendicular to a length of the chain and to the axes of the rollers, that is sufficient to allow the support pin(s) to pass through and is less than the dimension of a link.

This predetermined length is advantageously sufficient to allow a functional element to be fastened to the support pin. It is thus possible to fasten a functional element to a support pin, notably regardless of the position of the support pin on the chain and regardless of the relative position of the chain and of the support case.

Thus, a functional element can be fastened to the support chain well upstream of the support case in a direction of movement of the chain along its length. This can make it easier to fit a functional element, in particular when the part of the chain downstream of the functional case is difficult to access, such that the installation time for the functional element is reduced. Notably, this fitting can be effected outside a vessel into which the functional element is intended to be introduced: thus, this mounting can be effected in advance, before the support device has yet been installed in the vessel. This further reduces the time for which the vessel cannot be used on account of the installation of this type of equipment.

It will also be appreciated that, since the support pin(s) is/are secured to the support chain, it is possible to position a functional element on the support chain precisely and repeatably. Finally, since the support pin is rigid and non-deformable, the functional element can be fastened rigidly thereto, without any degree of freedom. The functional element can also be mounted as close as possible to the chain, resulting in an increase in useful height, for example charging height, inside a vessel receiving the support device. When this functional element is a sensor, its measuring capacity is also improved. For example, for a sensor having a dead zone over the last 500 mm for measurement, an increase of 200/300 mm can be observed.

The support device according to the invention may also have one or more of the following features:

Said at least one support pin extends in the continuation of a roller of the link that supports it. This can make it easier to realize the support pin. Advantageously, said at least one support pin can then be made in one piece with a link roller. As a variant, it can be fastened removably to the roller of the link. The roller can have for example a cylindrical shape, optionally provided with an internal bore, or a frustoconical shape, and the pin can be inserted into the roller by interlocking, screwing or the like.

The support chain has a plurality of support pins distributed along the length of the chain. This makes it possible to fasten different functional elements along the support chain.

The support chain has at least one support chosen from a functional-element support and a cable support. Notably, this support can be designed to hold the functional element or the cable without damaging them, notably without piercing. The functional-element support may comprise a yoke fastened to the support pin, the relative positions of which can be adjustable in one degree of freedom prior to fastening, and a part for fastening the functional element fastened to the yoke, the relative positions of which can be adjustable in another degree of freedom prior to fastening. This fastening part may receive a part of the functional element. The cable support may have at least one open housing closed by a closure element.

The support pin may have a threaded bore of axis coincident with the axis of a roller, and said at least one support may then be fastened to the support pin by a screw, notably a thumbwheel screw, allowing it to be fastened without tools.

The case comprises two casings that define the internal housing and are assembled along a plane perpendicular to the axes of the rollers, said casings holding, between one another, at least one lower guide rail and at least one upper guide rail for guiding the rollers, one of the casings being formed of two separate, spaced-apart parts that define the slot between one another. The case can then be realized in a simple manner.

Note that the invention can also relate to the above-described rigid chain support provided with support pins, which is optionally equipped with at least one support chosen from a functional-element support and a cable support, as described above.

The invention also relates to a system for monitoring the distribution of solid particles inside a vessel, comprising:
at least one support device according to the invention,
at least one functional element fastened to a predetermined support pin of the support chain of a support device, notably by a function-element support, said functional element being a sensor that is able to collect information about the charging of the vessel. Advantageously, said at least one functional element may be fastened rigidly to the support pin, without being able to move with respect to the support pin. This can make it possible to improve the quality of information picked up by the sensor and thus improve monitoring.

Advantageously, said at least one functional element may be connected to at least one power supply and/or information transfer cable. The cable(s) can then be fastened to at least one other support pin, notably by a cable support. This can make it possible to limit damage to the cable while the support chain is moving and also to avoid a situation in which a cable passes in front of the functional element, risking disrupting the collection of information. This also makes it possible to avoid a situation in which the cable gets caught in elements adjoining the support device, notably when the latter is inside a vessel. When these adjoining elements are mobile, this can cause the cable to tear out.

Such a monitoring system can advantageously be used to monitor the charging of solid particles into a vessel, notably into a reactor of the chemical, electrochemical, oil or petrochemical type.

The invention also relates to a method for installing a system for monitoring the distribution of solid particles inside a vessel, said monitoring system comprising:
at least one support device for at least one functional element according to the invention,
at least one functional element fastened to a predetermined support pin of the support chain, said functional element being a sensor that is able to collect information about the charging of the vessel.

According to the invention, the method comprises:
a step of mounting each support device inside the vessel,
a step of fastening at least one functional element to a predetermined support pin of the chain of a support device, upstream of the case of the latter in relation to a direction of movement of the chain toward the interior of the vessel,
an optional step of fastening to at least one other support pin of the chain at least one power supply and/or information transfer cable connected to said functional element,
a step of moving the chain of the support device bearing the functional element toward the interior of the vessel so as to position said at least one functional element downstream of the case, at a predetermined position inside the vessel.

The mounting step may comprise the fastening of the support device, notably of the support case, to a system for distributing solid particles. Such a distribution system may comprise a device for holding a device for charging solid particles, this holding device being designed to hold the charging device in the vessel. In particular, the system for distributing solid particles may be designed such that the holding device and the support device of the invention can be mounted on the device for charging solid particles while being movable with respect to the charging device, as described for example in the earlier application WO2013186497.

The fastening step may be carried out before or after the introduction of the support device into the vessel. The fastening step may consist of fastening a functional element to a support pin rigidly, i.e. without any freedom of movement. Such rigid fastening may be obtained for example by a clamping collar held by screws, by screwing the functional element directly to the pin, or by any other appropriate means.

The fastening step may also consist of fastening that allows one or more degrees of freedom, for example by means of an appropriate support for directly supporting the functional element or for supporting a cable connected to the functional element. In the latter case, the cable support may hold the cable sufficiently rigidly to allow the latter to support the functional element, the functional element being positioned on its own under the effect of gravity.

The step of moving the chain may also consist of moving the chain manually or by a motor.

In the present application, the terms "top", "bottom", "upper", "lower", "vertical", "horizontal", "lateral", "above", "below" etc. are defined in the conventional meaning of these terms (meaning that the vertical direction is the direction of the gravity vector, this gravity vector being oriented from top to bottom), for a support device fastened to a distribution system placed under normal use conditions, that is to say with its longitudinal axis oriented in the direction of the gravity vector. Of course, the support device or the system is able to be oriented differently, notably while it is being transported.

Substantially horizontal, longitudinal or vertical is understood as meaning a direction/plane that forms an angle of at most ±20°, or of at most 10° or at most 5°, with a horizontal, longitudinal or vertical direction/plane.

Substantially parallel, perpendicular or at a right angle is understood as meaning a direction/angle that deviates by at most ±20°, or by at most 10° or at most 5°, from a parallel or perpendicular direction or from a right angle.

The invention will be understood better with reference to the figures, which illustrate nonlimiting embodiments.

FIG. 2 is a perspective depiction of the support device shown in FIG. 1;

FIG. 3 is a partial perspective depiction of the support device shown in FIG. 1;

FIG. 4 is a top view of a part of the support device shown in FIG. 1;

FIG. 5 is a side view of a roller axis according to one embodiment;

FIG. 6 is a perspective depiction of a functional-element support according to one embodiment;

FIGS. 6a to 6e show perspective views (FIGS. 6a-6d) or a side view (FIG. 6e) of the parts that form the support shown in FIG. 6;

Identical references may be used to denote elements that are identical or similar from one figure to another.

Figure 1:
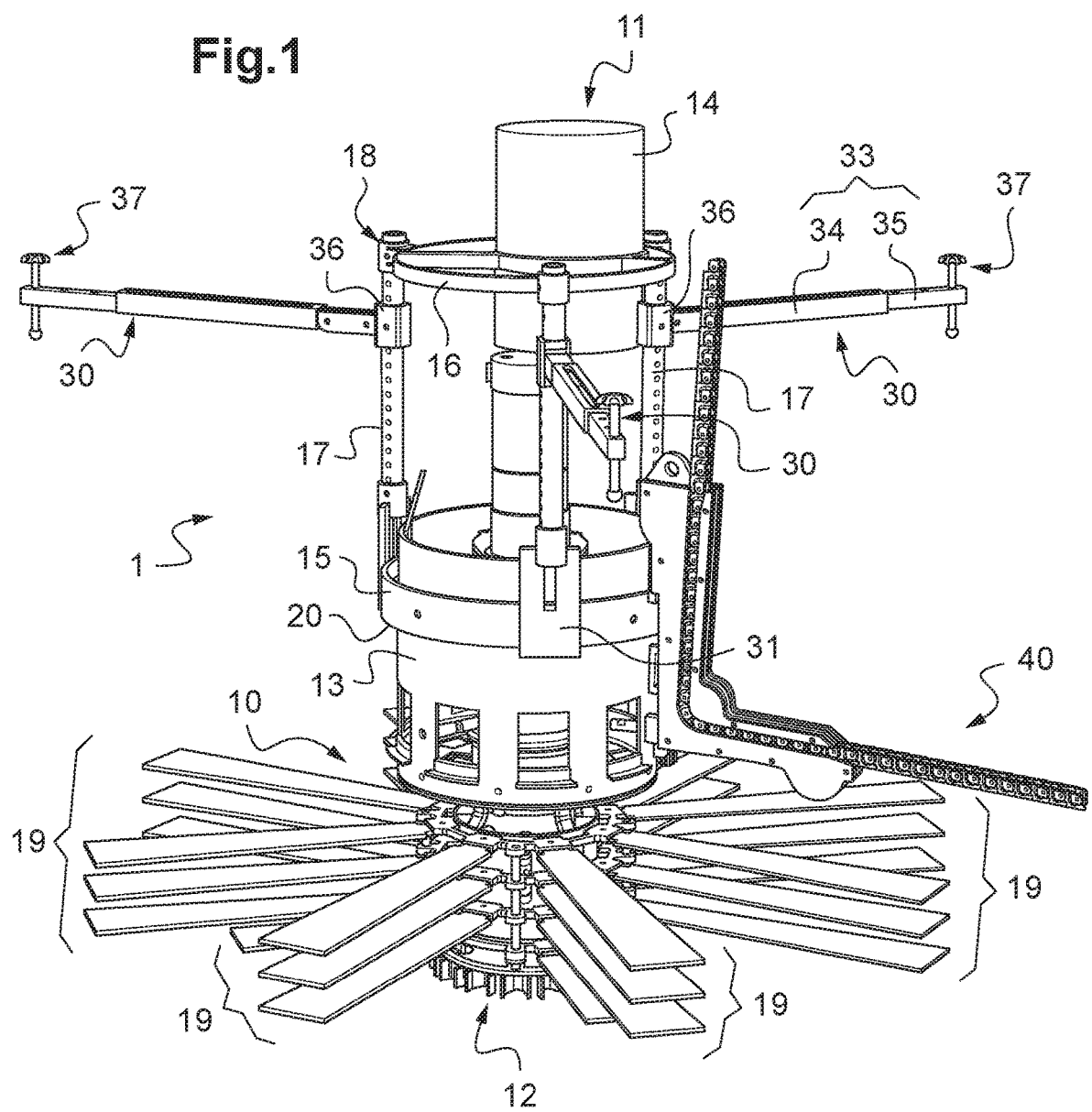
FIG. 1 is a perspective depiction of a system for distributing particles that is equipped with a support device according to one embodiment of the invention.

With reference to FIG. 1, a system 1 for distributing solid particles comprises a charging device 10 designed to introduce solid particles, for example beads, catalyst extrudates (not shown), or the like, into a vessel, for example a reactor (not shown). This distribution system 1 is similar to the distribution system described in the document WO2013/186497. The principal elements thereof are described below.

The charging device 10 defines a passage for the circulation of these solid particles from an inlet 11 to an outlet 12. In this embodiment, blades 19, for example in the form of strips, disposed at the outlet of the charging device 10, make it possible to better distribute the solid particles in the reactor. The blades 19 are shown in this case in the substantially horizontal position that they take up under the effect of the rotation during the charging of particles. At rest, these blades 19 are oriented downwardly.

The charging device 10 comprises a main body 13, or drum, made of metal, and also a riser 14, intended for feeding solid particles (not shown) to the charging device. This riser 14 comprises a lower metal ring 15 and an upper metal ring 16. This upper ring 16 is fastened to a ring support 18 mounted on metal leg extensions 17 in the general form of hollow tubes.

The lower metal ring 15, in this case in the form of a circular metal band, is mounted on the charging device 10 and secured to the latter by screwing via orifices 20.

The distribution system 1 also comprises three holding devices 30 mounted on the circular band 15. Each of these holding devices comprises a fastening plate 31 that is mounted on the circular band 15 and supports a leg extension 17.

Fastened to this leg extension 17 is a fastening arm 33 made of metal. This fastening arm 33 comprises a slide 34 and a slide extension 35, able to slide inside the slide 34.

In this example, the holding device comprises, at the end of the slide 34, a guide ring 36 that is able to be mounted on the tube of the leg extension 17. This guide ring is pierced by an orifice for heightwise locking.

Thus, the arm 33 can be fitted on the leg extension 17. This leg extension 17 is pierced with orifices that are regularly spaced apart from one another such that the height of each arm 33 can be adjusted by means of a peg (not shown).

As described in the document WO2013/186497, the fastening plates 31 and the circular band 15 have complementary shapes for coupling each fastening plate 31 to the circular band 15, each fastening plate also being able to be locked to the circular band 15. Furthermore, each fastening plate 31 can slide on the circular band 15, allowing the arms 33 to be positioned angularly with respect to one another.

Returning to FIG. 1, the distribution system 1 also comprises three sensor support devices 40, only one of which is shown in FIG. 1 so as not to clutter the figure.

More sensor support devices, for example five, or fewer sensor support devices, for example only one, can be provided. Generally, in the present application, "one" means "one or more".

The support device 40 is fastened to the circular band 15 for example by a fastening plate of the same type as the fastening plates 31 of the holding devices 30, notably as described in the document WO2013/186497.

The support device 40 will now be described with reference to FIGS. 2 to 7. It comprises a rigid support chain 401 formed of a plurality of links 402 articulated in pairs by rollers 403. The axes of the rollers are parallel to one another. These links 402 are arranged such that the chain 401 can only bend in one direction from a rectilinear state. This bending is obtained by rotation of the links about the roller axes. This support chain is thus capable of supporting a functional element 50, such as a sensor. The support chain 401 is generally made entirely of metal.

Moreover, the support chain 401 is equipped with a plurality of support pins 404 each secured to a link 402. These support pins 404 protrude from one side of the chain, parallel to the axis of the link rollers 403, as can be seen in FIGS. 2 to 4.

The support device 40 also comprises a closed support case 405 provided with an internal housing 406 having a first end 407 that opens onto an inlet face 408 of the support case and a second end 409 that opens onto an outlet face 410 of the support case. This inlet face 408 and outlet face 410 are separate. In this case, they are substantially perpendicular to one another and substantially perpendicular to the direction of movement of the chain at the respective ends 407, 408. The internal housing 406 thus defines a substantially L-shaped chain path. This chain path receives and guides the support chain 401 from the inlet face 408 to the outlet face 410.

Note that the case 405 is also L-shaped. This case is closed at all of its faces. The only openings are the two openings provided at the inlet face 408 and outlet face 410 for the passage of the chain, and the slot 412, described below.

According to the invention, one face 411 of the case extending substantially perpendicularly to the axes of the rollers 403 connecting the links has a through-slot 412 communicating with the internal housing 406. This slot 412 extends along the entire length of the internal housing and its dimensions, in a plane substantially perpendicular to the rollers 403, are sufficient to allow only the support pins 404 to pass through. In the present example, the slot 412 has a dimension, in a direction perpendicular to a length of the chain and to the axes of the rollers 403, that is sufficient to allow the support pins 404 to pass through and smaller than the dimension of a link 402, as can be seen more particularly in FIG. 4. The slot 412 extends in this case next to the pins and is centered on the latter in a direction perpendicular to the pins and to the length of the chain. Generally, regardless of the shape of the internal housing 406 and of the support pins 404, it will be noted that, on its face facing the slot 412, a link 402 is at least partially next to a wall of the internal housing 406, on either side of the slot 412 (see FIG. 4).

Furthermore, the support pins 404 pass through the slot 412 and protrude from the support case 405, more precisely from the face 411 of the case, by a predetermined length. For example, regardless of the shape of the pin, this length can be from 1 to 10 cm, preferably from 2 to 8 cm. The invention is not limited to a particular pin length, however, as long as this length is sufficient to make it possible to fasten an element to the pin.

In the example shown, each support pin 404 extends in the continuation of a roller 403 of the link that supports it. In particular, in the example shown in FIG. 5, this support pin 404 is made in one piece with a roller 403, preferably made of metal.

The support pins shown here have a substantially cylindrical shape. The invention is not limited to a particular shape, however, and a pin could have a conical shape, or have a cross section that is not circular but polygonal, for example in the form of a quadrilateral, notably a regular quadrilateral. A pin could thus have two opposite flat faces. A support pin could also be pierced in order to allow a screw, peg or the like to pass through. Thus, in the example shown in FIG. 5, the end of the pin 404 remote from the roller 403 has a threaded internal bore 404$i$, of the same axis as the axis of the roller 403 and of the pin 404. It will thus be appreciated that it is possible to fasten an element to the support pin 404 simply by screwing.

A support pin could also be fastened removably to a roller, in other words a support pin could be removable. It could then be fastened inside a roller by interlocking, screwing or the like (not shown). For example, the pin could have a cylindrical shape and have a thread on its external face that cooperates with a corresponding internal thread of the roller. As a variant, the pin could be fastened inside the roller following a quarter-turn rotation.

Moreover, in the present example, the pins are all identical in shape. However, pins with different shapes could also be provided, for example to fasten different types of functional elements or other accessories.

The case 405 in this case comprises two casings 405$a$, 405$b$ that define the internal housing 406 between one another. These two casings 405$a$, 405$b$ are assembled along a plane perpendicular to the rollers 403 of the chain. They also hold, between one another, a lower guide rail 405$c$ and an upper guide rail 405$d$ for guiding the rollers 403 of the links of the support chain.

In order to form the slot 412, one of the casings 405$a$ is formed of two separate parts 405$a$1, 405$a$2 that are spaced apart at a predetermined distance, corresponding to the width of the slot 412 in a direction perpendicular to the axis of the rollers 403.

In the present example, the different parts of the case 405 are assembled together by screwing.

As can be seen more particularly in FIG. 3, the case 405 may also have housings 413 for receiving a guide drum 414 or guide pinion 415 for guiding and making it easier to move the chain. The drum 414 or the pinion 415 are mounted so as to rotate about an axis parallel to the axes of the rollers 403.

As can be seen in FIG. 2, a functional element 50 is fastened to a pin 404, for example by means of a support (not shown in FIG. 2). This functional element 50 is in this case a sensor that is able to collect information about the charging of the vessel. In the present example, this sensor is connected to a power supply cable 51 and to an information transfer cable 52. These two cables 51, 52 are in this case put together in a sheath 53, shown partially for greater clarity. The sheath 53 is fastened to another, adjacent pin 404 by a cable support 600. This sheath 53 can thus be held along the chain 401 by being fastened to the pins 404, thereby avoiding a situation in which the cable(s) disrupt the movement of the chain or move in front of the sensor 50 or other functional elements that may be fastened to the chain 401.

The support used to fasten the functional element 50 to a pin 404 may be a simple clamping collar or a more complex support as described with reference to FIGS. 6 and 6$a$-6$e$.

Figure 6E:
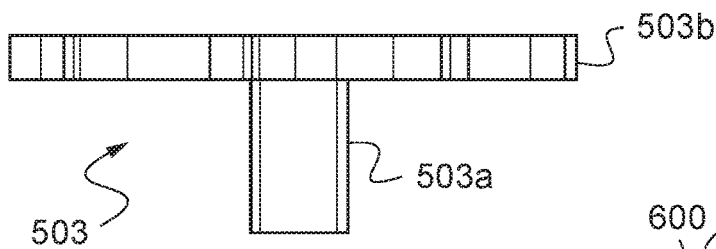

FIG. 6 shows a functional-element support 500 comprising a yoke 501 designed to be fastened to the support pin 404 close to its center.

In the embodiment shown, this yoke 501 is pierced by an orifice 502 (FIG. 6$c$) for a fastening screw 503 (FIG. 5) to pass through. In this example, the fastening screw 503 has a threaded part 503$a$ that can be screwed into the bore 404$i$ in the support pin 404 and a part 503$b$ that forms a thumbwheel and makes it possible to manually screw the fastening screw 503 (see FIGS. 6, 6$e$ and 5). Note that the thumbwheel is situated on the concave side of the yoke 501, the screw passing through the latter.

Mounted on the yoke 501 is a fastening part 506 for fastening the functional element. To this end, in the example, the yoke 501 has two orifices 504, 505, the axes of which are coincident (FIG. 6$c$). The fastening part 506 is for its part provided with two fastening lugs 507 that are each pierced by two orifices 507$a$, 507$b$, the axes of the orifices 507$a$ and the axes of the orifices 507$b$, respectively, being coincident. The fastening part 506 can thus be fastened to the yoke 501 by the orifices 507$a$ (FIG. 6) or 507$b$ (not shown). In the example, the fastening part 506 is in the form of an annulus, notably designed to receive a functional element. The latter is thus introduced into the annulus 506 and rests on the latter without it being necessary to pierce the functional element. The functional element can be held in place simply by screws that come to bear against the surface of the functional element.

Note that the axis of the orifices 504, 505 is in this case perpendicular to the axis of the orifice 502: it is thus possible to pivot the support 500 about the axis of the orifice 502 and thereby to choose its orientation while it is being fastened to the pin 404. Similarly, it is possible to pivot the fastening part 506 about the axis of the orifices 507*a* or 507*b* and thereby to choose its orientation with respect to the yoke 501 while it is being fastened thereto. It will thus be appreciated that the position of the functional element can be chosen freely by rotation about these two axes.

Of course, the invention is not limited to a particular shape of the yoke 501 and of the fastening part 506. Moreover, these latter parts could be fastened together without any possibility of adjusting their relative positions. This fastening could be realized by any appropriate fastening means (screwing, snap-fastening, riveting). Although it is preferable for the yoke 501 and the fastening part 506 to be separate parts, thereby making it possible to use a specific fastening part 506 for each functional element, it is conceivable for the fastening part 506 to be produced as one with the yoke 501.

In the example shown, the functional-element support 500 furthermore comprises another yoke 508, this time U-shaped, mounted on the yoke 501, next to the fastening part 506. In this example, the yoke 508 has two wings 509 that are each pierced with two orifices 509*a*, 509*b*, the axes of the orifices 509*a* and the axes of the orifices 509*b*, respectively, being coincident. This yoke 508 makes it possible to reinforce the fastening part 506 and also to protect the part of the functional element that is situated between the annulus of the fastening part 506 and the yoke 508.

Finally, in the example, the functional-element support 500 also comprises a cable support 510 fastened to the yoke 501. This cable support 510 is in the form of a bent plate, which is perforated in this case in order to be more lightweight, the end of which remote from the yoke 501 has a flat part 511 for receiving a portion of the cable (in this case of the sheath 53) and a part 512 that is inclined with respect to the part 511 for retaining the cable portion. The cable support 510 is fastened to the yoke 501 by screwing via for example pierced lugs 513. Finally, in the example, this cable support 510 has a lug 514 bent down in front of the thumbwheel 503*b* of the fastening screw in order to retain the latter. In other words, the thumbwheel 503*b* is sandwiched between the yoke 501 and the lug 514.

Figure 7:
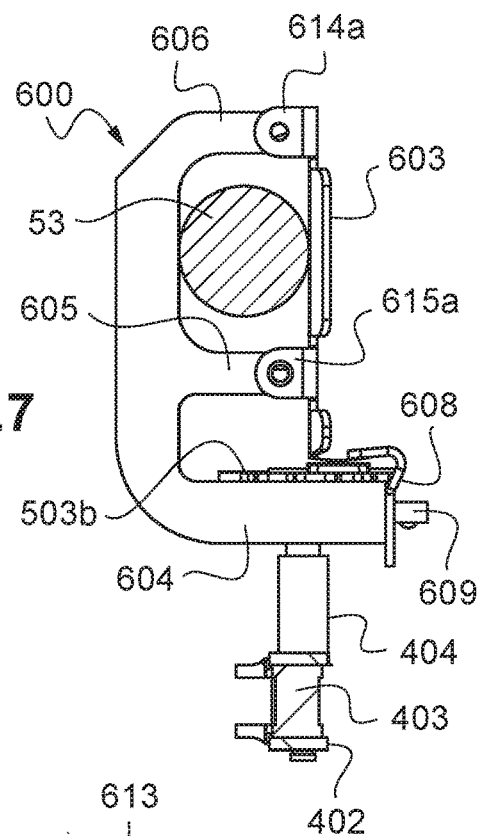
FIG. 7 is a top view of a cable support.
Figure 7A:
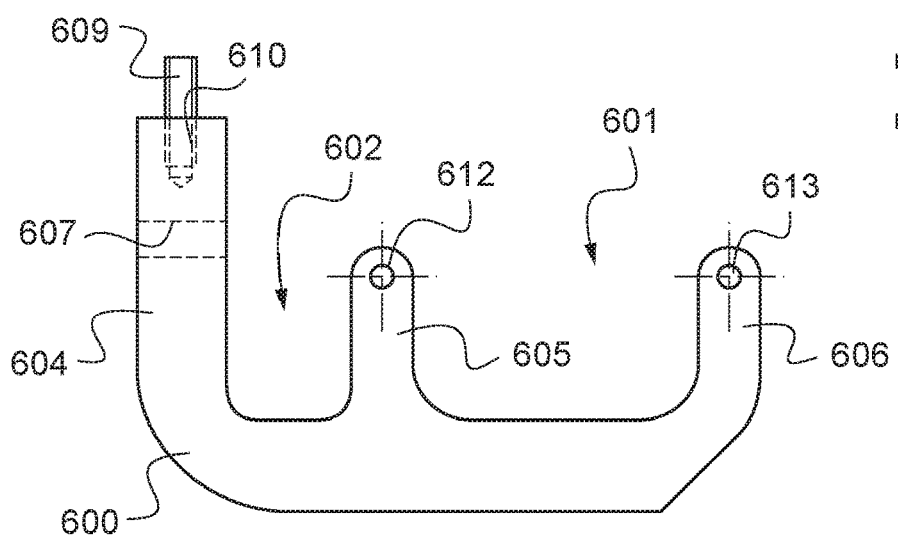
FIGS. 7a to 7c are a side view (FIG. 7a) or perspective views (FIGS. 7b-7c) of the parts of the cable support in FIG. 7.
Figure 7B:
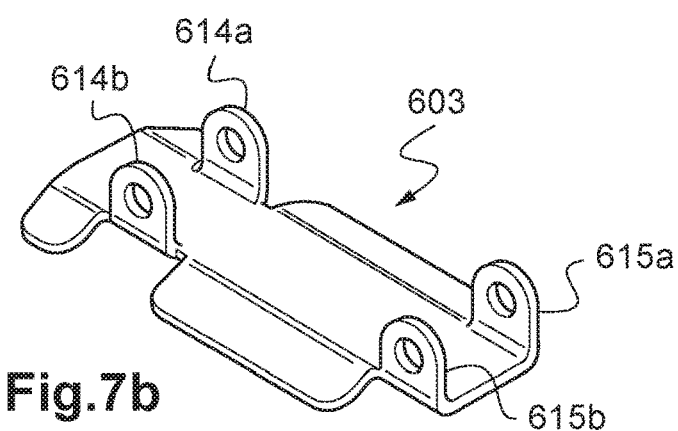
Figure 7C:
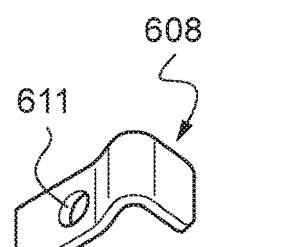

The support used to fasten the cable (in this case the sheath 53) to a pin 404 may be a simple clamping collar or a more complex support as described with reference to FIGS. 7 and 7*a*, 7*c*.

FIG. 6 shows a cable support 600 having at least one open housing 601, two open housing 601, 602 in the example. Each housing 601, 602 has a U-like shape for receiving one or more cables or sheaths 53. The housing(s) 601, 602 are closed by a closure element 603, which is preferably removable. In the example, one of the housings 602 defines a passage of reduced cross section compared with the other housing: it makes it possible to rigidly hold a cable such that the latter can support the functional element.

This cable support 600 is in this case in the form of a plate cut in the form of a comb. Three substantially parallel arms 604, 605, 606 define the two U-shaped housings. One of the end arms 604 serves to fasten the cable support 600 to the support pin 404. To this end, it is pierced with an orifice 607 for a fastening screw to pass through, for example the thumbwheel fastening screw 503 described with reference to FIG. 5. In the example shown, the end arm 604 is also equipped with a retaining plate 608 for the thumbwheel 503*b*, this retaining plate 608 being fastened to the cable support 600 by a screw 609 that passes through the orifice 611 in the retaining plate and is screwed into a bore 610 in the arm 604 (see FIGS. 7, 7*a*, 7*c*). The thumbwheel 503*b* is in this case sandwiched between the retaining plate 608 and the arm 604 (FIG. 7).

Each of the other arms 605, 606 is pierced with a through-orifice 612, 613 for fastening the closure element 603. To this end, the latter has a pair of pierced fastening lugs 614*a*, 614*b*; 615*a*, 615*b* for each arm 605, 606, the end of each arm being interlocked between each pair of lugs. The closure element 603 can be held in place by pegs or screws passing through the orifices 612, 613 and the pierced plates 614*a,b*, 615*a,b*.

Thus in the example described, the cable support 600 and the functional-element support 500 are fastened to a support pin 404 by identical fastening means, in this case the thumbwheel fastening screw 503, thereby reducing the manufacturing costs. Moreover, the use of a thumbwheel fastening screw makes it possible to rapidly fasten these support elements manually.

The assembly formed by a support device 40 (or a plurality thereof) and one or more functional elements 50 is part of a system 60 for monitoring the distribution of solid particles inside a vessel.

This monitoring system 60 can be installed inside a vessel as described below.

During a first step (mounting step), the support device(s) 40 is/are mounted inside the vessel. In the present example, each support device 40 is fastened to the circular band 15 of the distribution system 1 by means of fastening plates 31. The distribution system 1 is for its part fastened to the vessel, by means of the holding devices 30. Notably to this end, the arms 33 can comprise, at their opposite end from the end secured to the leg extensions 17, means for fastening to the reactor, for example swivel-type feet 37 that are intended to rest on a plate of the reactor. The support devices 40 can be fastened to the distribution system 1 before or after the latter is installed in the vessel.

One or more functional elements are thus fastened to each support device 40 during a fastening step. To this end, each functional element 50 is fastened to a support pin. This fastening is preferably realized upstream of the case 405 in relation to a direction of movement of the chain 401 toward the interior of the vessel. This makes it possible to effect fastening to a part of the chain that is more easily accessible notably when the charging device is positioned inside the vessel. Optionally, the power and information collecting cables 51, 52 are likewise fastened to the pins 404, notably such that the cables, optionally put together in the sheath 53, run along the rigid chain 401.

The chain 401 can then be moved toward the interior of the vessel so as to position the functional elements 50 downstream of the case 405, at a predetermined position inside the vessel. The functional elements are then situated on the substantially horizontal part of the chain 401, which is scarcely accessible or accessible with difficulty when the charging device 10 is installed in the vessel.

It will thus be appreciated that it is possible to easily position a functional element inside the vessel by means of a support device according to the invention, this positioning also being precise. The functional element can also always be fastened in the same way, at the same position, from one filling monitoring operation to another.

The invention claimed is:

1. A support device for at least one functional element, comprising:
   a rigid support chain formed of a plurality of links articulated in pairs by rollers, the axes of which are parallel and arranged such that the rigid support chain can only bend in one direction from a rectilinear state,
   a closed support case provided with an internal housing having a first end that opens onto an inlet face of the support case and a second end that opens onto an outlet face of the support case, separate from the inlet face, the internal housing defining a chain path for receiving and guiding the rigid support chain from the inlet face to the outlet face,
   wherein the rigid support chain is equipped with at least one support pin secured to a link, the support pin(s) protruding from one side of the rigid support chain, parallel to the axes of the rollers,
   wherein the support pin has a threaded bore of axis coincident with the axis of a roller, and in that said at least one support is fastened to the support pin by a screw, notably a thumbwheel screw;
   and one face of the case extending substantially perpendicularly to the axes of the rollers has a through-slot communicating with the internal housing, the through-slot extending along the entire length of the internal housing and having dimensions, in a plane perpendicular to the axes of the rollers, that are sufficient to allow only the support pin(s) to pass through, the support pin passing through the through-slot and protruding from the closed support case by a predetermined length.

2. The support device of claim 1, wherein the at least one support pin extends in the continuation of a roller of the link that supports it.

3. The support device of claim 2, wherein the at least one support pin is made in one piece with a link roller.

4. The support device of claim 2, wherein the at least one support pin is fastened removably to the roller of the link.

5. The support device of claim 1, wherein the rigid support chain has a plurality of support pins distributed along the length of the rigid support chain.

6. The support device of claim 1, wherein the case comprises two casings that define the internal housing and are assembled along a plane perpendicular to the axes of the rollers, said casings holding, between one another, at least one lower guide rail and at least one upper guide rail for guiding the rollers, one of the casings being formed of two separate, spaced-apart parts that define the through-slot between one another.

7. The support device of claim 1, wherein the rigid support chain has at least one support chosen from a functional-element support and a cable support.

8. The support device of claim 7, wherein the functional-element support comprises a yoke fastened to the support pin, the relative positions of which can be adjustable in one degree of freedom prior to fastening, and a part for fastening the functional element fastened to the yoke, the relative positions of which can be adjustable in another degree of freedom prior to fastening.

9. The support device of claim 7, wherein the cable support has at least one open housing closed by a closure element.

10. A system for monitoring the distribution of solid particles inside a vessel, comprising:
   at least one support device, the at least one support device comprising:
      a rigid support chain formed of a plurality of links articulated in pairs by rollers, the axes of which are parallel and arranged such that the rigid support chain can only bend in one direction from a rectilinear state,
      a closed support case provided with an internal housing having a first end that opens onto an inlet face of the support case and a second end that opens onto an outlet face of the support case, separate from the inlet face, the internal housing defining a chain path for receiving and guiding the rigid support chain from the inlet face to the outlet face,
   wherein the rigid support chain is equipped with at least one support pin secured to a link, the support pin(s) protruding from one side of the rigid support chain, parallel to the axes of the rollers,
   wherein the support pin has a threaded bore of axis coincident with the axis of a roller, and in that said at least one support is fastened to the support pin by a screw, notably a thumbwheel screw,
   and one face of the case extending substantially perpendicularly to the axes of the rollers has a through-slot communicating with the internal housing, the through-slot extending along the entire length of the internal housing and having dimensions, in a plane perpendicular to the axes of the rollers, that are sufficient to allow only the support pin(s) to pass through, the support pin passing through the through-slot and protruding from the support case by a predetermined length; and
   at least one functional element fastened to a predetermined support pin of the rigid support chain of a support device, said functional element being a sensor that is able to collect information about the charging of the vessel.

11. The monitoring system of claim 10, characterized in that said at least one functional element is fastened rigidly to the support pin, without being able to move with respect to the support pin.

12. The monitoring system of claim 10, characterized in that said at least one functional element is connected to at least one power supply and/or information transfer cable, and in that the cable(s) is/are fastened to at least one other support pin.

13. A method for installing, inside a vessel, a system for monitoring the distribution of solid particles, the system comprising at least one support device, the at least one support device comprising:
   a rigid support chain formed of a plurality of links articulated in pairs by rollers, the axes of which are parallel and arranged such that the rigid support chain can only bend in one direction from a rectilinear state,
   a closed support case provided with an internal housing having a first end that opens onto an inlet face of the support case and a second end that opens onto an outlet face of the support case, separate from the inlet face, the internal housing defining a chain path for receiving and guiding the support chain from the inlet face to the outlet face,
   wherein the rigid support chain is equipped with at least one support pin secured to a link, the support pin(s) protruding from one side of the rigid support chain, parallel to the axes of the rollers,
   wherein the support pin has a threaded bore of axis coincident with the axis of a roller, and in that said at least one support is fastened to the support pin by a screw, notably a thumbwheel screw and one face of the case extending substantially perpendicularly to the axes of the rollers has a through-slot communicating with the internal housing, the through-slot extending along the entire length of the internal housing and having dimensions, in a plane perpendicular to the axes of the rollers, that are sufficient to allow only the support pin(s) to pass through, the support pin passing through the through-slot and protruding from the support case by a predetermined length; and at least one functional element fastened to a predetermined support pin of the rigid support chain of a support device, said functional element being a sensor that is able to collect information about the charging of the vessel;

the method comprising:

a step of mounting each support device inside the vessel, a step of fastening at least one functional element to a predetermined support pin of the rigid chain of a support device, upstream of the case of the latter in relation to a direction of movement of the chain toward the interior of the vessel, a step of fastening to at least one other support pin of the rigid support chain at least one power supply and/or information transfer cable connected to said functional element, a step of moving the rigid support chain of the support device bearing the functional element toward the interior of the vessel so as to position said at least one functional element downstream of the case, at a predetermined position inside the vessel.

\* \* \* \* \*